United States Patent [19]

Toda et al.

[11] Patent Number: 4,817,372
[45] Date of Patent: Apr. 4, 1989

[54] POWER LAWN MOWER

[75] Inventors: Toshihiro Toda; Masato Mukainakano, both of Saitama; Shigeto Iwadare, Tokyo; Masatoshi Ihara, Saitama, all of Japan

[73] Assignee: Honda Giken Kogyo Kabushiki Kaisha, Tokyo, Japan

[21] Appl. No.: 149,998

[22] Filed: Jan. 28, 1988

Related U.S. Application Data

[63] Continuation of Ser. No. 757,412, Jul. 22, 1985, abandoned.

[30] Foreign Application Priority Data

Jul. 23, 1984 [JP] Japan ................. 59-153663
Jul. 23, 1984 [JP] Japan ................. 59-153664
Jul. 23, 1984 [JP] Japan ................. 59-153665
Jul. 23, 1984 [JP] Japan ............. 59-112165[U]

[51] Int. Cl.$^4$ .......................................... A01D 87/10
[52] U.S. Cl. ..................................... 56/12.8; 56/17.5; 56/320.2; 56/13.3
[58] Field of Search ............. 56/12.7, 12.8–13.4, 56/17.3–17.5, 320.1–320.2, DIG. 8, DIG. 17

[56] References Cited

U.S. PATENT DOCUMENTS

| | | | |
|---|---|---|---|
| 2,642,711 | 6/1953 | Smith et al. | 56/255 |
| 2,760,327 | 8/1956 | Bovee | 56/13.4 |
| 2,953,887 | 9/1960 | Boesch, Jr. et al. | 56/17.5 X |
| 2,957,295 | 10/1960 | Brown | 56/17.5 X |
| 2,984,961 | 5/1961 | Judkins | 56/13.1 |
| 3,008,283 | 11/1961 | Wood, Jr. | 56/17.5 X |
| 3,049,854 | 8/1962 | Denney | 56/12.9 |
| 3,145,519 | 8/1964 | Pearson | 56/320.2 |
| 3,396,518 | 8/1968 | Johnson | 56/17.5 X |
| 3,400,523 | 9/1968 | Klingoestrom et al. | 56/320.2 X |
| 3,496,707 | 2/1970 | Kobey | 56/17.5 |
| 3,503,194 | 3/1970 | Ritums | 56/17.5 X |
| 3,696,595 | 10/1972 | Dahl | 56/17.4 X |
| 3,918,119 | 11/1975 | Sweet | 56/13.4 |
| 3,959,954 | 6/1976 | Halsten | 56/12.8 |
| 4,121,405 | 10/1978 | Wolf | 56/295 X |
| 4,161,096 | 7/1979 | Biberger | 56/13.4 X |
| 4,194,345 | 3/1980 | Pioch | 56/320.2 X |
| 4,245,455 | 1/1981 | Martin | 56/17.5 X |
| 4,262,548 | 4/1981 | Haft et al. | 56/17.5 X |
| 4,335,567 | 7/1982 | Comer | 56/12.7 |
| 4,407,112 | 10/1983 | Shepherd et al. | 56/320.2 X |
| 4,466,235 | 8/1984 | Cole | 56/320.2 X |

FOREIGN PATENT DOCUMENTS 436147 7/1971 Australia .
385473 12/1932 United Kingdom .

*Primary Examiner*—Kyle L. Howell
*Assistant Examiner*—Angela D. Sikes
*Attorney, Agent, or Firm*—Armstrong, Nikaido Marmelstein & Kubovcik

[57] ABSTRACT

A power lawn mower has a cutter blade mounted on a vertical output shaft driven by an engine and extending substantially horizontally, and a housing covering the cutter blade. The power lawn mower has a throw-out plate for throwing out the grass cut by the cutter blade, the throw-out plate being mounted on the output shaft above the cutter blade within the housing and extending substantially horizontally. The throw-out plate is angularly spaced from the cutter blade and positioned therebehind in the direction of rotation of the throw-out plate. The throw-out plate is shorter than the cutter blade and substantially flat. The throw-out plate includes a throw-out arm having a leading edge in the direction of rotation thereof and curved progressively rearwardly in the same direction from a proximal end of the throw-out arm to a radially outward end thereof. The housing has a front half portion pivotably mounted on a housing body for upward tilted movement about an axis inclined with respect to the direction of travel of the power lawn mower.

10 Claims, 5 Drawing Sheets

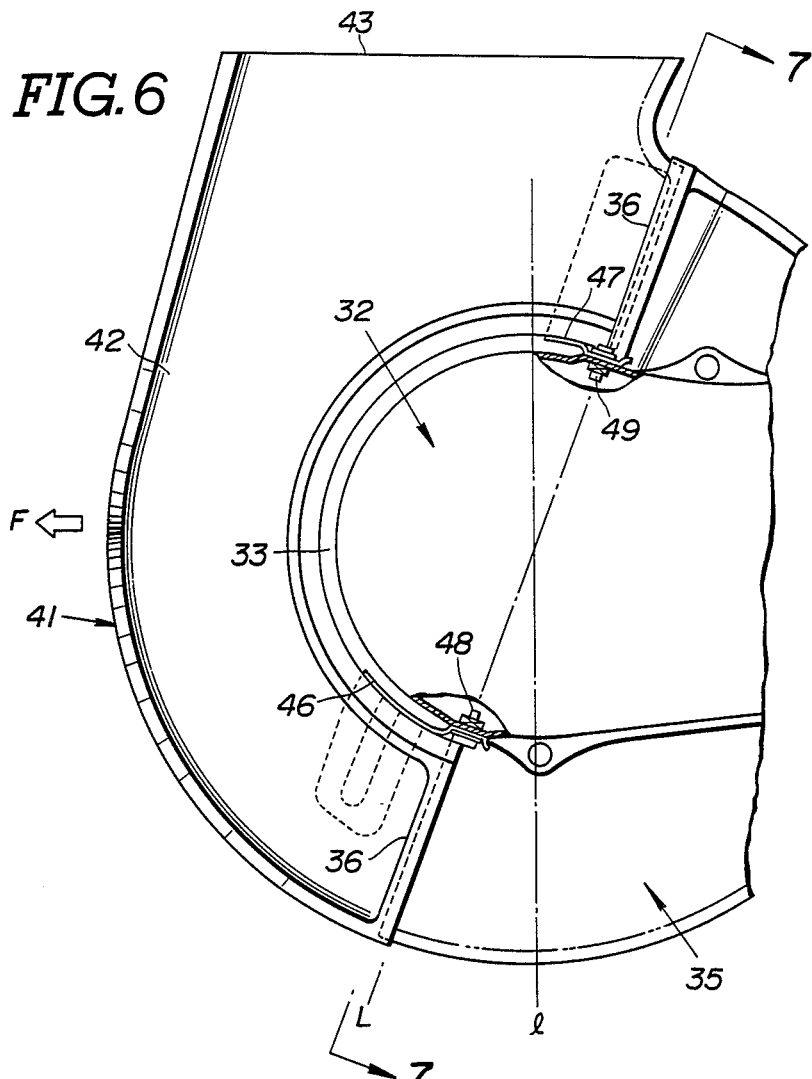
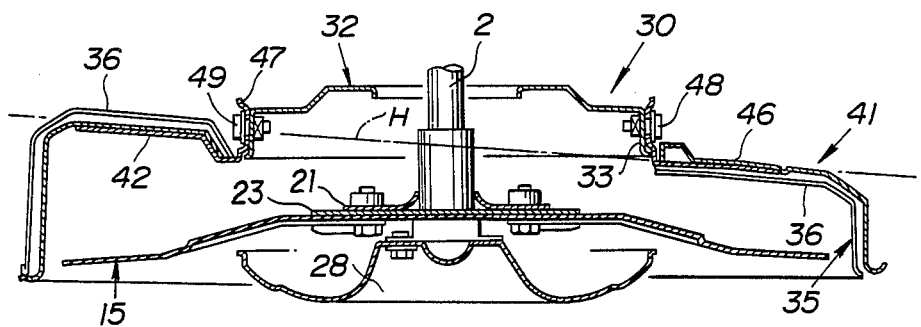

POWER LAWN MOWER

This application is a continuation of application Ser. No. 757,412 filed July 22, 1985, now abandoned.

BACKGROUND OF THE INVENTION

The present invention relates to a power lawn mower.

Power lawn mowers have a cutter housing and a cutter blade accommodated in the cutter housing and mounted on a vertical shaft driven by a power unit to rotate the cutter blade in a substantially horizontal plane.

When cutting the grass, the cut grass tends to be jammed between the cutter blade and the cutter housing, and the jammed grass presents a resistance to the rotation of the cutter blade, resulting in a power loss. To overcome this deficiency, it is customary to provide a large vertical clearance between the cutter blade and the cutter housing. However, such a vertical clearance is not always effective in freeing the cut grass especially when the long grass is cut.

One solution has been to attach fins to the cutter blade for laterally discharging or throwing out grass cuttings. However, the fins are subject to an air resistance leading to a power loss. The fins are therefore not suitable for use in small lawn mowers having low-output engines for rotating cutter blades.

The present invention has been made in an effort to eliminate the shortcoming of the conventional power lawn mowers.

SUMMARY OF THE INVENTION

It is an object of the present invention relating to a power lawn mower of a small size having a low-output engine and a simple construction for smoothly and reliably discharging or throwing out grass cuttings.

According to the present invention, there is provided a power lawn mower including an engine having an output shaft extending vertically downwardly, a cutter blade mounted on the output shaft for rotation therewith and extending substantially horizontally for cutting the grass in response to rotation of the output shaft, a substantially cylindrical housing disposed in downwardly and laterally covering relation to the cutter blade and opening downwardly, and a throw-out plate mounted on the output shaft above the cutter blade within the housing for throwing out the grass cut by the cutter blade, the throw-out plate extending substantially horizontally in angularly spaced relation to the cutter blade.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 6 is a fragmentary plan view of the cutter housing, with the pivot portions by which a front half portion of the housing is pivotably connected to a housing body being partly broken away; and FIG. 7 is a vertical cross-sectional view taken along line 7—7 of FIG. 6.

DESCRIPTION OF THE PREFERRED EMBODIMENT

Figure 1:
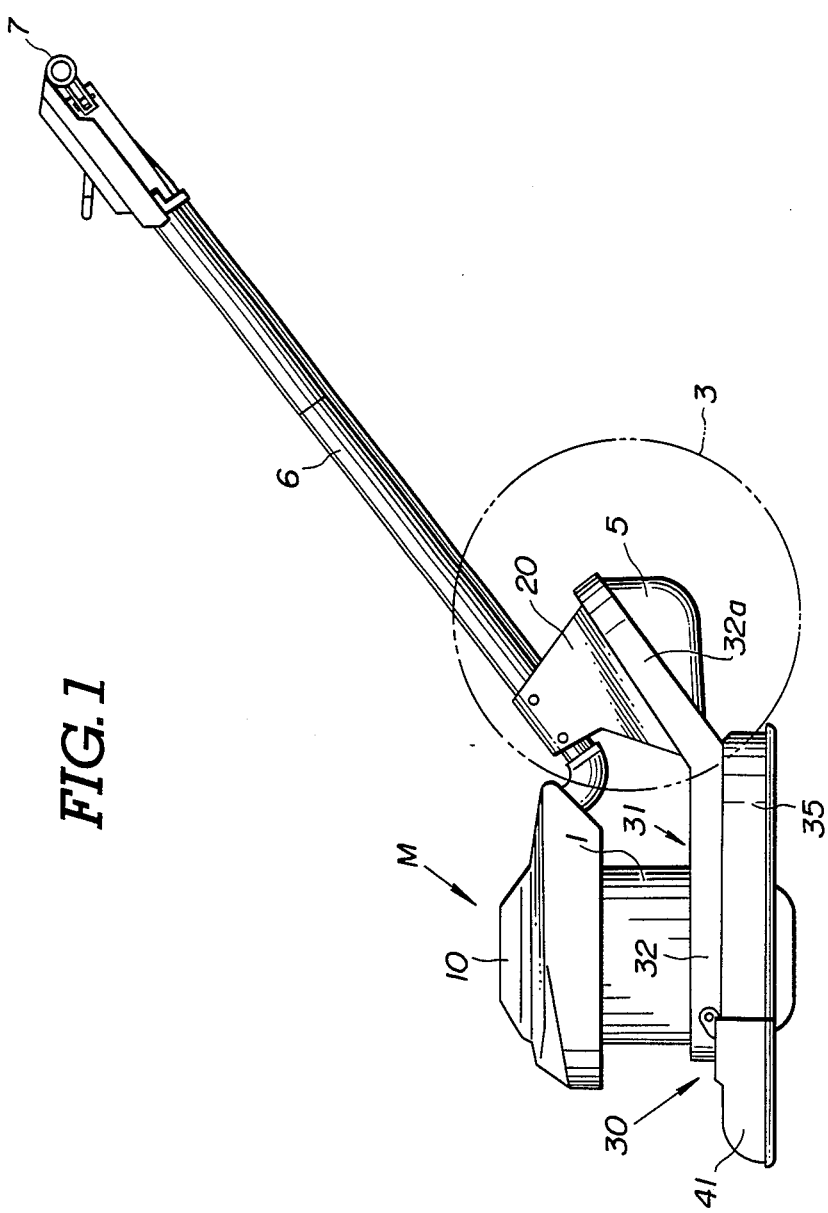
FIG. 1 is a side elevational view of a power lawn mower according to the present invention.
Figure 2:
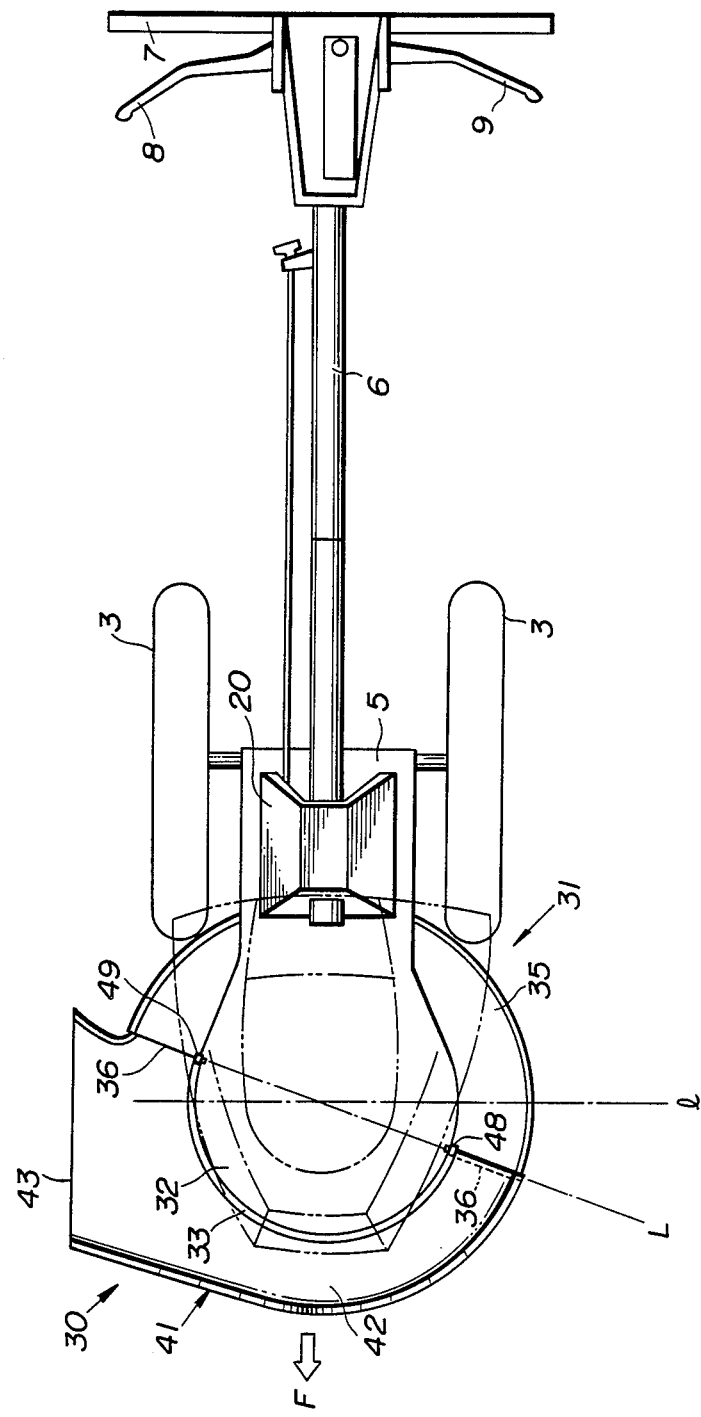
FIG. 2 is a plan view of the power lawn mower shown in FIG. 1.

As illustrated in FIGS. 1 and 2, a power lawn mower M has a cutter housing 30 with an engine 1 mounted thereon. The cutter housing 30 has a housing center 32 including a rearward extension 32a supporting on its lower surface a transmission case 5 housing a transmission assembly therein. The transmission assembly in the transmission case 5 is operatively connected to a belt-and-pulley mechanism 4 (FIG. 3) for transmitting the power of the engine 1 to a pair of drive wheels 3 rotatably mounted on a rear end portion of the cutter housing 30.

A handle holder 20 is mounted on the upper surface of the housing center extension 32a and supports a tubular handle post 6 extending upwardly and rearwardly. A bar handle 7 and control levers 8, 9 are attached to the upper end of the tubular handle post 6. The engine 1 is covered with an upper cover 10 housing therein a fuel tank, a carburetor, a muffler, and other parts therein.

The cutter housing 30 opens downwardly and includes an openable and closable front half portion 41 pivotably attached to a housing body 31 for upward tilted movement about a line L which is inclined clockwise (FIG. 2) about a vertical axis of the cutter housing 30 with respect to the direction F of travel of the power lawn mower M. The cutter housing 30 also has a grass discharge outlet 43 opening laterally for discharging grass cuttings laterally to the right (FIG. 2).

Figure 3:
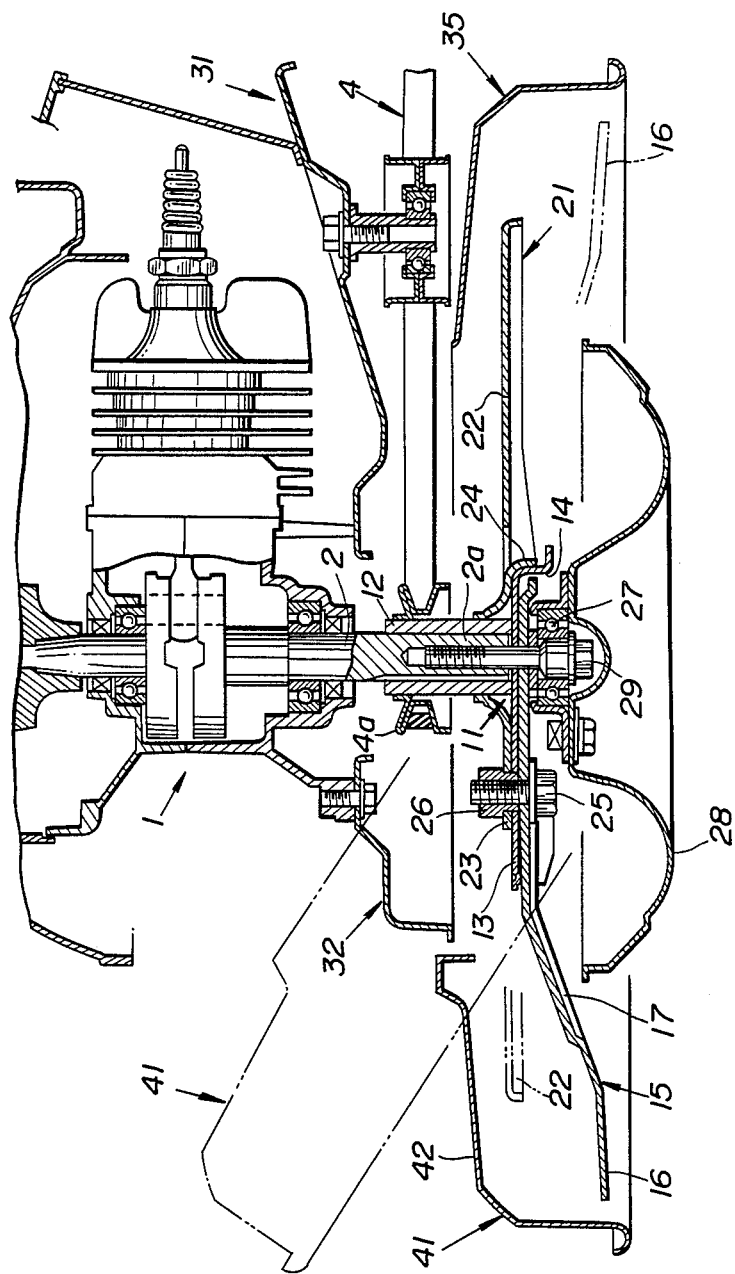
FIG. 3 is an enlarged fragmentary vertical cross-sectional view of a cutter assembly including an engine, the view showing a cutter blade and a throw-out plate attached to a crankshaft as taken along line 3—3 of FIG. 4.

As shown in FIG. 3, the engine 1 has an output shaft or crankshaft 2 extending vertically and having a lower end portion 2a projecting into the cutter housing 30. A single cutter blade 15 is mounted by a holder 11 on the lower end portion 2a of the crankshaft 2. A substantially horizontal single throw-out plate 21 is also mounted on the lower end portion 2a of the crankshaft 2 above the cutter blade 15, the throw-out plate 21 being about 90° spaced from the cutter blade 15 and positioned therebehind in the direction X of rotation. A dish-shaped guide member 28 is rotatably mounted by a bearing 27 on the lower end of the crankshaft 2.

The cutter housing 30 has a substantially cylindrical configuration in downwardly and laterally covering relation to the cutter blade 15 which rotates in a substantially horizontal plane. The front half portion 41 of the cutter housing 30 is positioned forwardly in the direction of travel indicated by the arrow F in FIG. 2.

More specifically, the housing body 31 is composed of the housing center 32 fixed to the lower portion of the engine 1 and a rear half portion 35 stepped downwardly from the housing center 32 and extending radially outwardly of the housing center 32. The rear half portion 35 of the housing body 31 has an opening 36 (FIGS. 2 and 6) which can be opened forwardly by lifting the front half portion 41 of the housing 30. The opening 36 is defined obliquely or tilted clockwise with respect to the direction F of travel as shown in FIGS. 2 and 6. In the illustrated embodiment, the opening 36 is defined on the line L which is tilted clockwise through about 20° with respect to the line l normal to the direction F of travel.

The front half portion 41 of the housing 30 has laterally spaced portions hinged to a peripheral wall 33 (FIG. 6) of the housing center 32. Specifically, as shown in FIGS. 6 and 7, hinge plates 46, 47 are welded to the lower surfaces of laterally spaced portions of an upper wall of the front half portion 41 of the housing 40, and the hinge plates 46, 47 are pivotably connected by pivot pins 48, 49, respectively, to the peripheral wall 33.

The discharge outlet 43 is defined in the front half portion 41 and opens laterally to the right (FIGS. 2 and 6) with respect to the direction F of travel. The upper wall 42 of the front half portion 41 is slanted along a line H (FIG. 7) tilted upwardly to the right with respect to the direction F of travel (or to the left in FIG. 7) such that the upper wall 42 is highest at the discharge outlet 43.

Figure 4:
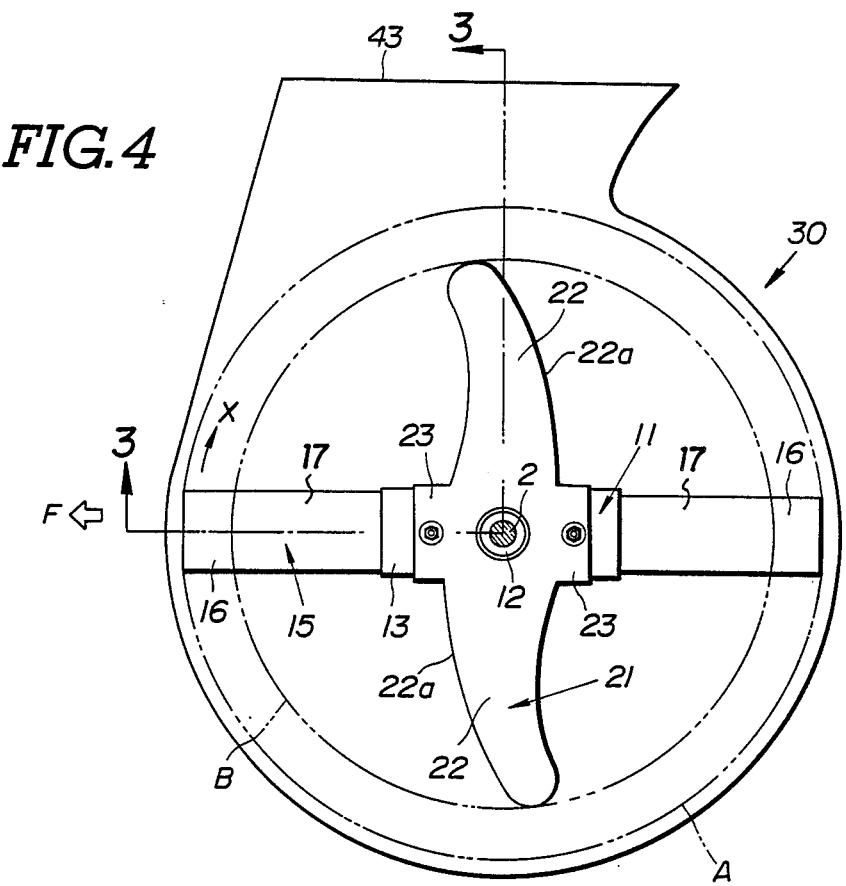
FIG. 4 is a plan view of components in a cutter housing.
Figure 5:
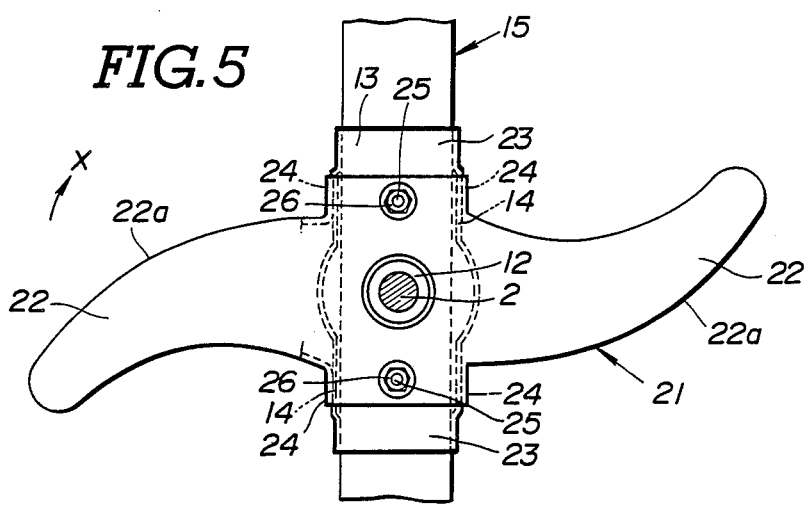
FIG. 5 is a fragmentary plan view of the cutter blade, the throw-out plate, and a holder plate therefor.

The cutter blade 15 and the throw-out plate 21 are mounted on the crankshaft 2 as shown in FIGS. 3 through 5.

The holder 11 includes a holder plate 13 welded to the lower end of a collar 12 fitted over the lower end portion 2a of the crankshaft 2. The holder plate 13 is substantially rectangular in shape and has downwardly extending flanges 14, 14 bent from longer edges of the holder plate 13.

The cutter blade 15 has cutting edges 16 joined by bent intermediate portions 17 to a central portion of the cutter blade 15 and positioned downwardly of the central portion thereof.

The throw-out plate 21 is substantially flat and shorter than the cutter blade 15 so that, when the cutter blade 15 and the throw-out plate 21 are rotated by the crankshaft 2, the diametrically opposite ends of the throw-out plate 21 follow a circular path B having a diameter smaller than the circular path A followed by the diametrically opposite ends of the cutter blade 15. As shown in FIG. 4, the throw-out plate 21 has a pair of diametrically opposite throw-out arms 22 each including a leading edge 22a in the direction X of rotation of the throw-out plate 21, the leading edge 22a being swept or curved smoothly rearwardly with respect to the direction X of rotation from the proximal end to the distal end of the throw-out arm 22. However, each leading edge 22a may be straight and inclined rearwardly in the direction X of rotation.

The throw-out plate 21 has a pair of attachment legs 23, 23 extending across the central portion thereof in a direction normal to the throw-out arms 22, 22. Each of the attachment legs 23, 23 has a pair of downwardly bent flanges 24, 24 laterally spaced from each other.

For assembly, the central portion of the throw-out plate 21 is downwardly fitted over the collar 12, and the attachment legs 23, 23 are placed on the upper surface of the holder plate 13. Then, the collar 12 and the throw-out plate 21 are welded together, and the flanges 14, 14 of the holder plate 13 are welded to the flanges 24, 24 of the attachment legs 23, 23.

The collar 12 to which is attached the holder 11 with the throw-out plate 21 joined thereto is fitted over the lower end portion 2a of the crankshaft 2, and the central portion of the cutter blade 15 is placed on the lower surface of the holder plate 13. The holder plate 13, the cutter blade 15, and the throw-out plate 21 are firmly coupled together by means of a pair of bolts 25, 25 and a pair of nuts 26, 26 fastened on the attachment legs 23, 23, respectively.

Finally, a lock bolt 29 is threaded into the lower end portion 2a of the crankshaft 2. The belt-and-pulley mechanism 4 has a drive pulley 4a fixed to the upper portion of the collar 12.

In operation, the cutter blade 15 and the throw-out plate 21 are caused by the crankshaft 2 to rotate in the horizontal plane in substantially 90°-spaced relation to each other, while the power lawn mower M moves in the direction of the arrow F (FIG. 4).

While in the illustrated embodiment the cutter blade 15 and the throw-out plate 21 are about 90° spaced from each other, the cutter blade 15 and the throw-out plate 21 as positioned behind the cutter blade 15 in the direction X of rotation may be angularly spaced at an angle smaller than 90°.

Grass leaves cut by the cutting edges 16 of the cutter blade 15 upon rotation thereof fall over a hypothetical disc-shaped plane formed by the cutter blade 15 as it rotates, particularly, a hypothetical plane formed by the intermediate portions 17 of the cutter blade 15. The grass cuttings are then hit by the leading edges 22a of the throw-out plate 21 and continuously thrown out rightwardly of the cutter housing 30 through the discharge outlet 43 while the throw-out plate 21 is in rotation. The path B followed by the throw-out plate 21 is smaller in diameter than the path A followed by the cutter blade 15, and the leading edges 22a are positioned angularly behind the cutting edges 16 with respect to the direction F of travel. For these reasons, the leading edges 22a do not push over the grass before it is cut by the cutting edges 16, and can reliably throw out grass leaves cut by the cutting edges 16. Since the leading edges 22a are curved, they serve to guide the grass cuttings which hit the leading edges 22a to be impelled laterally or radially outwardly. Therefore, the grass cuttings can smoothly and reliably be discharged by the throw-out plate 21.

When the relatively short grass is cut with the front half portion 41 of the housing 30 being closed, the cut grass is thrown out by the throw-out plate 22 into the discharge outlet 43. Inasmuch as the upper wall 42 of the front half portion 41 is raised toward the discharge outlet 43 and the discharge outlet 43 has a large space therein, the cut grass is prevented from being jammed between the cutter blade 15 and the housing 30.

When the relatively long grass is cut with the front half portion 41 lifted as indicated by the imaginary lines in FIG. 3, the grass cuttings are discharged along the inclined line L (FIG. 6) since the front half portion 41 is raised along the line L. As a result, the cut grass leaves are prevented from being deposited forwardly in the direction F of travel, and hence the grass cutting can continuously and smoothly be carried out. Because the cut grass is discharged to one side of the power lawn mower M, the direction in which the cut grass is discharged can be fixed even with the front half portion 41 open, and the discharged grass cuttings can efficiently be collected.

The throw-out plate 21 is substantially flat and hence subject to a small air resistance, and the line L about which the front half portion 41 is pivotable with respect to the housing body 31. Accordingly, any power loss in small-size power lawn mowers powered by small-size engines is reduced. The power lawn mower can therefore smoothly and continuously cut the grass and throw out grass cuttings, while being powered by a small-size and low-output engine. As the throw-out plate 21 is fastened to the holder plate 13 by the bolts 25 and nuts 26 which are used to secure the cutter blade 15 to the holder plate 13, the number of additional parts required is reduced to a minimum, and such parts can easily be attached. The throw-out plate 21 is fastened in place by the bolts and nuts which are spaced at a relatively large interval or span, so that the throw-out plate 21 is firmly fixed in position against forces imposed thereon by the rotation thereof.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A power lawn mower comprising:
    an engine having an output shaft extending vertically downwardly;
    a cutter blade having a central portion mounted on said output shaft for rotation therewith, a cutting edge at each end of said cutter blade and downward-sloped intermediate portions of said cutter blade joining each cutting edge to said central portion of said cutter blade;
    a housing mounted to a lower portion of said engine and positioned at a lower portion of said output shaft to cover said cutter blade, said housing having a substantially flat ceiling portion and a substantially cylindrical portion extending downwardly from the periphery of said ceiling portion; and
    a throw-out plate mounted on said output shaft between said ceiling portion of said housing and said cutter blade, said throw-out plate having a pair of throw-out arms each being substantially flat so as not to generate an air flow and each having a distal end portion positioned between and away from both said cutter blade and said ceiling portion, each throw-out arm having a curved leading edge along a substantially whole front edge thereof for pushing cut grass outwardly along said leading edge.

2. A power lawn mower according to claim 1, wherein the distance between said distal end portions of the throw-out arms of said throw-out plate is less than the length of said cutter blade so that said throw-out plate follows a circular path smaller in diameter than a circular path followed by said cutter blade when said throw-out plate and said cutter blade are rotated.

3. A power lawn mower according to claim 1, wherein said throw-out plate has a central portion having an axis of rotation thereof and said throw-out arms extend radially outwardly from said central portion with the leading edge of each throw-out arm extending in the direction of rotation thereof for throwing out the cut grass.

4. A power lawn mower according to claim 3, wherein each throw-out arm has a proximal end close to said central portion and each said leading edge is progressively curved rearwardly in the direction of rotation of said throw-out plate from said proximal end to said distal end portion of its respective throw-out arm.

5. A power lawn mower according to claim 1, including a holder plate fixed to the lower portion of said output shaft, and fastener means interconnecting said cutter blade, said throw-out plate, and said holder plate.

6. A power lawn mower according to claim 5, wherein said throw-out plate has a central portion having an axis of rotation thereof, said thrown-out arms extend radially outwardly from said central portion, said central portion having a pair of attachment legs extending longitudinally of said cutter blade and said fastener means are mounted on said attachment legs.

7. A power lawn mower according to claim 6, wherein said central portion of said cutter blade is placed on a lower surface of said holder plate and said central portion of said throw-out plate is placed on an upper surface of said holder plate.

8. A power lawn mower according to claim 1, wherein said housing has a front half portion and a rear half portion and said front half portion is pivotally tiltable around an axis inclined with respect to the direction of travel of said power lawn mower.

9. A power lawn mower according to claim 1, wherein said distal end portion of said throw-out arms are angularly spaced from said cutting edges of said cutter blade by a predetermined angle.

10. A power lawn mower according to claim 9, wherein said predetermined angle is about 90°.

* * * * *